Patented Jan. 1, 1935

1,986,082

UNITED STATES PATENT OFFICE 1,986,082

PRODUCTION OF ETHYLENE OXIDE

Ferdinand Bernard Thole, Stanley Francis Birch, and William Dallas Scott, Sunbury-on-Thames, England, assignors to Anglo-Persian Oil Company Limited, London, England No Drawing. Application February 10, 1932, Serial No. 592,192. In Great Britain February 10, 1931

2 Claims. (Cl. 260—156.5)

This invention relates to the production of ethylene oxide from chlorhydrin by treatment with alkali.

The invention has among its objects in a simple way and continuously to secure high yields of ethylene oxide under such conditions that the production of glycol or other undesired products is avoided.

The invention is based upon the fact that when ethylene chlorhydrin solution (for example of 16% concentration) is mixed with slightly more than the theoretical quantity of a solution of caustic soda (for example of 30% concentration), at room temperature, or preferably at a lower, for example, below 15° C., the chlorhydrin is converted almost quantitatively into the oxide. The oxide may be removed for example by distillation or in a current of air or gas. Distillation is advantageously employed under considerably reduced pressure, and at a relatively low temperature, for example from 30–60° C., whereby the hydration of the oxide to glycol is avoided, at least to the extent that is advantageous and desirable.

Thus according to the invention the reaction is carried out at relatively low temperature being room temperature or a lower temperature and the solutions of chlorhydrin and alkali are admixed and the ethylene oxide is also removed at a relatively low temperature, and the removal of the ethylene oxide is effected under reduced pressure.

The invention comprises the conditions of method hereinafter described.

In carrying the invention into effect solutions of ethylene chlorhydrin and caustic soda of concentrations such as hereinbefore indicated are admixed at as low a temperature as conveniently possible such for example as from 10–20° C., and the mixture admitted continuously into an evacuated packed column at a convenient position in its length. The liquid may be used as reflux liquid for scrubbing the vapours passing up the column. Thus the position and manner of admission is determined accordingly. The pressure in the column may be approximately 95–105 mm.

Under the conditions indicated most of the oxide is at once flashed off and is removed through an outlet pipe overhead while the remainder is recovered by the application of a little heat to the liquid accumulating at the bottom of the column. The residual liquid containing only salt and a little caustic soda may be continuously withdrawn from the bottom of the column. The temperature of the residual solution leaving the column may be for example from 35–50° C. depending upon the pressure in the column.

The oxide removed overhead contains a little water, and to avoid trouble through the formation of the solid hydrate (melting point 10.5° C.) in the condensing system, it is preferred to condense the oxide on the pressure side of the vacuum pump employed.

In the production of ethylene oxide under conditions described yields of 95% or over of the theoretical have been secured.

The invention broadly comprises the carrying out of the reaction with solutions of a chlorhydrin and alkali under conditions in which the higher temperatures hitherto thought necessary to the reaction and for the removal of the ethylene oxide produced, are avoided. Thus the invention comprises broadly any comparable means for carrying out the reaction and for the evaporation of the oxide produced. Thus for example the solutions may be brought into contact within the vessel or column in which the ethylene oxide is removed by evaporation, and thus also any means for securing contact or admixture of the solutions under conditions favourable to the reaction and to the eventual removal of the oxide without resorting to the use of the higher temperatures hitherto usual, may be employed.

We claim:

1. A process for producing ethylene oxide from chlorhydrin by treatment with alkali in which solutions of the reagents, namely chlorhydrin and alkali, are admixed at a temperature within the range of from 10 to 20° C. and the proportion of alkali to chlorhydrin is slightly in excess of that theoretically necessary, the ethylene oxide formed being removed by distillation at a temperature within the range of from 30 to 60° C.

2. A process for producing ethylene oxide from chlorhydrin by treatment with alkali in which solutions of the reagents of a concentration approximating to 16% chlorhydrin and 30% caustic soda are admixed at a temperature not above room temperature, and the ethylene oxide formed is removed by distillation at a temperature within the range of from 30 to 60° C.

FERDINAND BERNARD THOLE.
STANLEY FRANCIS BIRCH.
WILLIAM DALLAS SCOTT.